United States Patent [19]
Nishidai

[11] Patent Number: 5,528,589
[45] Date of Patent: Jun. 18, 1996

[54] DISTRIBUTED TYPE PACKET SWITCHING SYSTEM AND A METHOD OF CONTROLLING A FLOW CONTROL EXECUTION

[75] Inventor: Kazuo Nishidai, Tokyo, Japan

[73] Assignee: NEC Corporation, Tokyo, Japan

[21] Appl. No.: 491,717

[22] Filed: Jun. 19, 1995

[30] Foreign Application Priority Data

Jun. 20, 1994 [JP] Japan .................................... 6-137112

[51] Int. Cl.⁶ ........................ H04L 12/407; H04L 12/56; H04L 29/02
[52] U.S. Cl. ................................. 370/60; 370/67
[58] Field of Search .................................. 370/13, 17, 60, 370/60.1, 94.1, 94.2, 67, 85.1, 85.2, 85.3, 85.4, 85.5, 85.13, 85.14, 85.15, 16

[56] References Cited

U.S. PATENT DOCUMENTS

| | | | |
|---|---|---|---|
| 4,550,402 | 10/1985 | Gable et al. ............................... | 370/60 |
| 4,611,321 | 9/1986 | Gabrielli et al. .......................... | 370/67 |
| 4,875,206 | 10/1989 | Nichols et al. ........................... | 370/60 |
| 4,958,341 | 9/1990 | Hemmady et al. ...................... | 370/60.1 |

*Primary Examiner*—Wellington Chin
*Attorney, Agent, or Firm*—Young & Thompson

[57] ABSTRACT

A distributed type packet switching system and a method of controlling a flow control execution, changes a communication control module to execute the flow control operation depending on the processing capability of each communication control module involved in the packet transmission. When a logical channel for the packet transmission between terminals 40 and 41 through a distributed type packet switching system 10 is established, a path f0 from the terminal 40 through a communication control module 30, a common bus 20 and a communication control module 31 to the terminal 41 is connected, and the communication control module 30 is specified to execute the flow control for this packet transmission. A congestion detected unit 330 supervises the load of processor in the communication control module 30 and reports the congestion condition to a flow control execution control unit 320 when it detects an overload condition of the processor. The flow control execution control unit 320 sends out a flow control substitution request signal S1 to the flow control execution control unit 321 in the other communication control module 31 through the common bus 20 to confirm whether it is acceptable. If the communication control module 31 has enough capacity to substitute the flow control execution, it sends back a flow control substitution acceptance signal S2 to the communication control module 30. Then, the packet transmission path is switched over from f0 to f1 and the flow control is executed by flow control execution unit 311 in the communication control module 31.

5 Claims, 3 Drawing Sheets

DISTRIBUTED TYPE PACKET SWITCHING SYSTEM AND A METHOD OF CONTROLLING A FLOW CONTROL EXECUTION

BACKGROUND OF THE INVENTION

1. Field of the Invention

The present invention relates to a distributed type packet switching system and a method of controlling a flow control execution, and more particularly, to a distributed type packet switching system which is provided with a common bus to connect a plurality of communication control modules, each module communicating with at least one terminal for transmitting and receiving data packets, and to a method for specifying a communication control module to execute flow control between two communication control modules engaged in data communication, depending on their respective processing capability.

2. Description of Related Art

Flow control is a general function in packet switching technology to control the volume of data to be transmitted from the originating side equipment, and it prevents excessive data from being transmitted to the terminating side equipment, Therefore, when congestion has occurred in a packet communication between an originating terminal and a terminating terminal, data transmission from the originating terminal is restricted to reduce the load of the packet communication.

In a distributed type packet switching system, which is provided with a common bus to connect a plurality of communication control modules, each module communicating with at least one terminal for transmitting and receiving data packets, the flow control is executed by either (or both) of communication control module(s) for the originating side or(and) the terminating side. The communication control module that is to execute the flow control is specified when a logical channel for the packet communication between the originating terminal and the terminating terminal is established, and once it has been specified, it does not change until the packet communication is completed.

The flow control execution is usually a burden to the communication control module, and extra processing capacity is needed for a processor in the communication control module to handle this operation. Therefore, when the communication control module itself is experiencing congestion due to handling excessive traffic, the processor in the communication control module easily becomes overloaded if the flow control is a/so executed by this module.

As described above, in the conventional distributed type packet switching system, it is not possible to share the load so as to decrease the burden on the communication control module which is currently executing the flow control, by changing the flow control execution operation to the opposite communication control module when the communication control module which is currently executing the flow control experiences congestion but the opposite communication control module has available capacity for processing. This causes a problem in providing smooth packet transmission by a processor having limited processing capacity, and it may require providing a processor having much higher processing capability or restricting the number of terminals in communication with the communication control module.

SUMMARY OF THE INVENTION

The present invention solves the above problems, by providing a distributed type packet switching system and a method of controlling flow control execution, which are capable of changing the communication control module which executes the flow control operation depending on the available processing capability of each communication control module involved in the packet transmission.

To do this, the distributed type packet switching system according to this invention, which includes a plurality of communication control modules, each module communicating with a plurality of terminals for packet communications and controlling communications of packets transferred between two of these terminals, and a common bus for connecting those communication control modules and providing communication paths for the two communication control modules that are communicating, comprises flow control execution means for executing a flow control of communication of packets, congestion detecting means for detecting an overload condition in the processing capability of its own communication control module, and for outputting information of the detected overload condition, and control means for controlling an execution operation of the flow control execution means by judging information output from the congestion detection means and information obtained from an opposite communication control module being used in a current communication of packets.

The control means comprises first signal transmit/receive means for transferring a substitution request signal for flow control to the opposite communication control module when the overload condition is indicated by information from the congestion detection means, and for receiving a response signal to such a request signal from the opposite communication control module, and first switchover means for switching over the flow control execution means to stop its operation when substitution of the flow control is accepted by the opposite communication control module, the acceptance being indicated in the response signal.

The control means also comprises second signal transmit/receive means for receiving a substitution request signal for flow control in the opposite communication control module, and transferring a response signal of acceptance to the request signal when no information is received from the congestion detection means, and transferring a response signal of rejection to the request signal when an overload condition is indicated by information from the congestion detection memos, and second switchover means for switching over the flow control execution means to start its operation when the response signal of acceptance to the request signal is transmitted.

The method of controlling a flow control execution in a distributed type packet-switching system according to the present invention comprises the following steps:

(1) executing a flow control of communication of packet information;

(2) detecting an overload condition in a processing capability of one communication control module;

(3) outputting information of the overload condition when it is detected;

(4) transferring a substitution request signal for flow control at the opposite communication control module when the overload condition is detected;

(5) receiving a response signal to the request signal from the opposite communication control module; and (6) controlling an execution operation of the flow control by judging the response signal from the opposite communication control module.

The method of controlling a flow control execution in a distributed type packet switching system according to the present invention may also comprise the following steps:

(1) detecting an overload condition in a processing capability of one communication control module;

(2) outputting information of the overload condition when it is detected;

(3) receiving a substitution request signal for flow control to be executed in the opposite communication control module;

(4) transferring a response signal of acceptance of substitution of the flow control to the request signal if no overload condition is detected;

(5) transferring a response signal of rejection of substitution of the flow control to the request signal if an overload condition is detected; and (6) starting an execution of said flow control if the response signal of acceptance is transferred.

A more complete understanding of the present invention and many of its attendant advantages will be more readily attained from the following detailed description when considered in connection with the accompanying figures.

DETAILED DESCRIPTION OF PREFERRED EMBODIMENT

Figure 1:
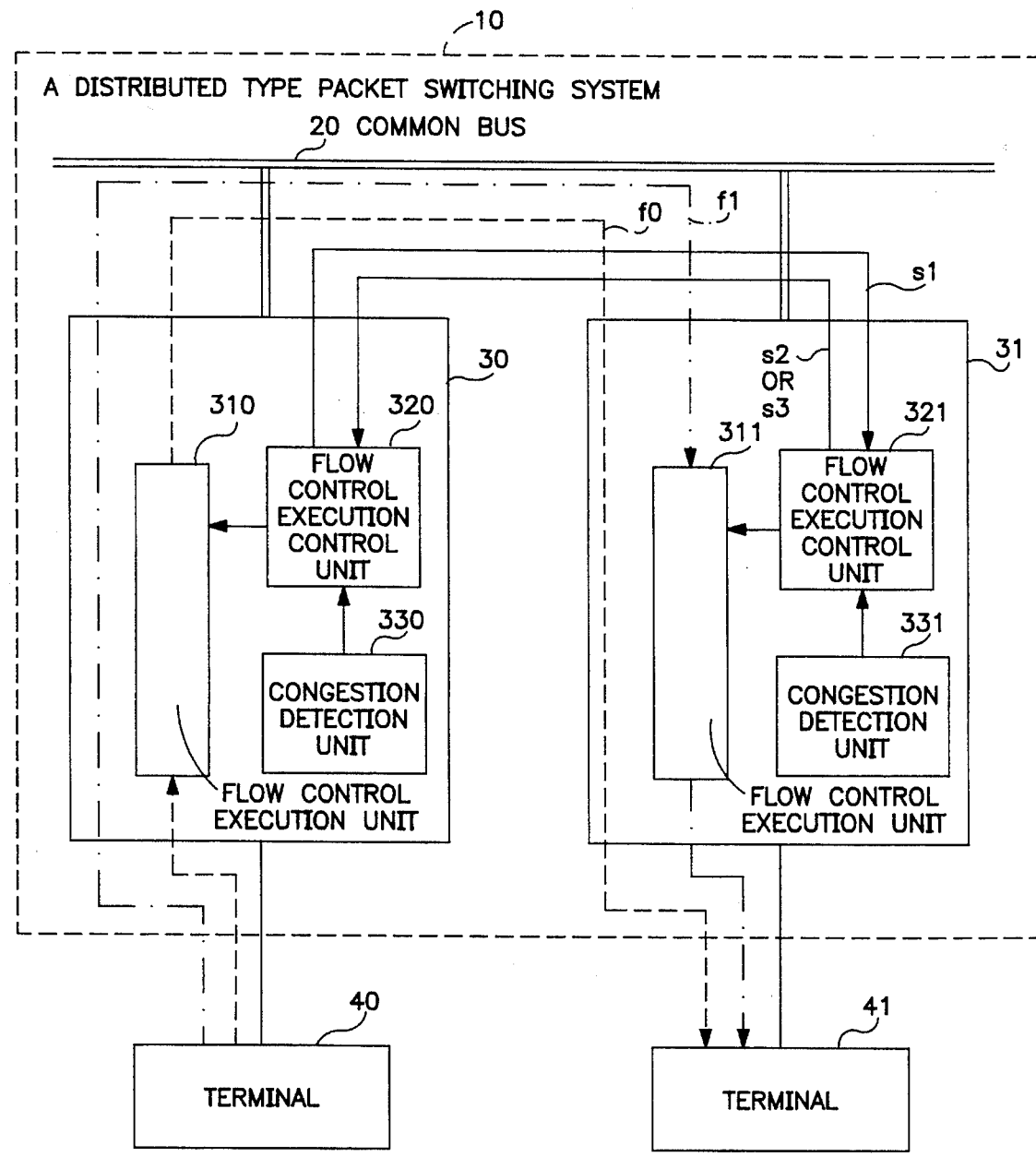
FIG. 1 is a schematic block diagram illustrating an embodiment of this invention.

FIG. 1 shows an embodiment of a distributed type packet switching system 10 which is provided with a common bus 20 for connecting a plurality of communication control modules 30 and 31 (only two of which are shown). Each communication control module accommodates a plurality of terminals 40 or 41 (only one is shown for each communication control module) for transmitting and receiving data packets, and a logic channel between terminals for dam transmission is established through the communication control module 31, the common bus 20 and the communication control module 31.

Each of the communication modules 30 and 31 has a software controlled processor (CPU), data buffers and other necessary elements for executing packet dam transmission. Since, however, the CPU, data buffers and other necessary elements for packet data transmission can be implemented by appropriate known technology, separate description of these elements is omitted and only those elements relating to this invention are described and illustrated.

Each of the communication control modules 30 and 31 is provided with a flow control execution unit 310 or 311 for preventing dam in excess of that which can be handled at the receiving side, from being transmitted during data transmission procedures; a congestion detection unit 330 or 331 for detecting congestion in its associated communication control module by monitoring CPU loads and reporting a congestion condition when the lead exceeds a predetermined threshold value; and a flow control execution control unit 320 or 321 for communicating with the flow control execution control unit in the opposite communication control module and controlling the flow control execution based on the report of a congestion condition from the congestion detection unit.

The operation of this embodiment will now be described.

A logical channel between terminal 40 and terminal 41 through the communication control module 30, the common bus 20 and the communication control module 31 is first set up by a call set up request from terminal 40 to terminal 41. Flow control execution unit 310 in communication control module 30 is specified to execute the flow control of this packet communication, and data packets and signal packets flow through a path f0 in which the flow control execution unit 310 is incorporated.

In this case, each congestion detection unit 330, 331 in each communication control module 30, 31 supervises the loads on its respective communication control module at predetermined intervals (e.g. every 10 seconds), and judges whether the communication control module is in a normal condition or a congestion condition by comparing its lead with a predetermined threshold value. When the lead exceeds the threshold value, there is judged to be a congestion condition. The CPU occupancy ratio (or usage ratio), or the buffer memory usage ratio, can be used for measuring the loads of the communication control module. For example, if the threshold value is predetermined as 70% of the CPU occupancy ratio, the congestion detection unit monitors the CPU occupancy ratio every 10 seconds, and when it detects a CPU occupancy ratio in excess of 70%, it is recognized as a congestion condition. Also, it can be arranged to recognize a congestion condition by monitoring at shorter periods and detecting congestion only when the CPU occupancy ratio exceeds 70% several times consecutively, there by avoid momentary loads being falsely detected as congestion.

When a congestion condition occurs at the communication control module 30, the flow control execution control unit 320 is notified thereof by the congestion detection unit 330, and communicates with the flow control execution control unit 321 in the opposite communication control unit 31 for a substitution control by exchanging specified control signals. If the opposite communication control unit 31 is available as a substitute for flow control execution, the path for packet communications is switched over from path f0 to path f1 which includes the flow control execution unit 311 incorporated in communication control module 31.

The manner of switching the flow control execution between the communication control modules 30 and 31 will be described with reference to FIGS. 2 and 3.

Figure 2:
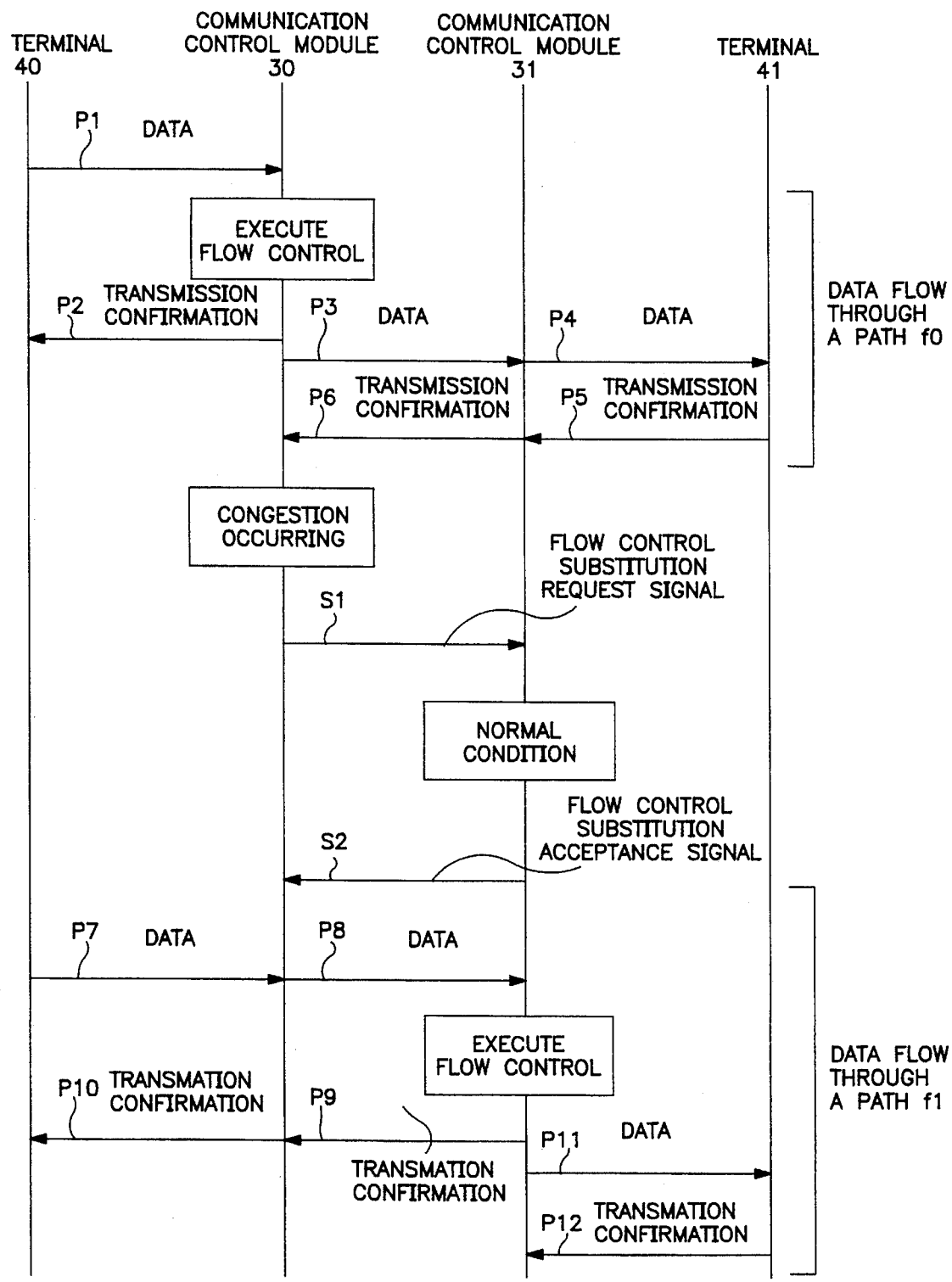
FIG. 2 is a sequence diagram showing data flow and signal flow when the substitution of the flow control execution is accepted by the other communication control module.
Figure 3:
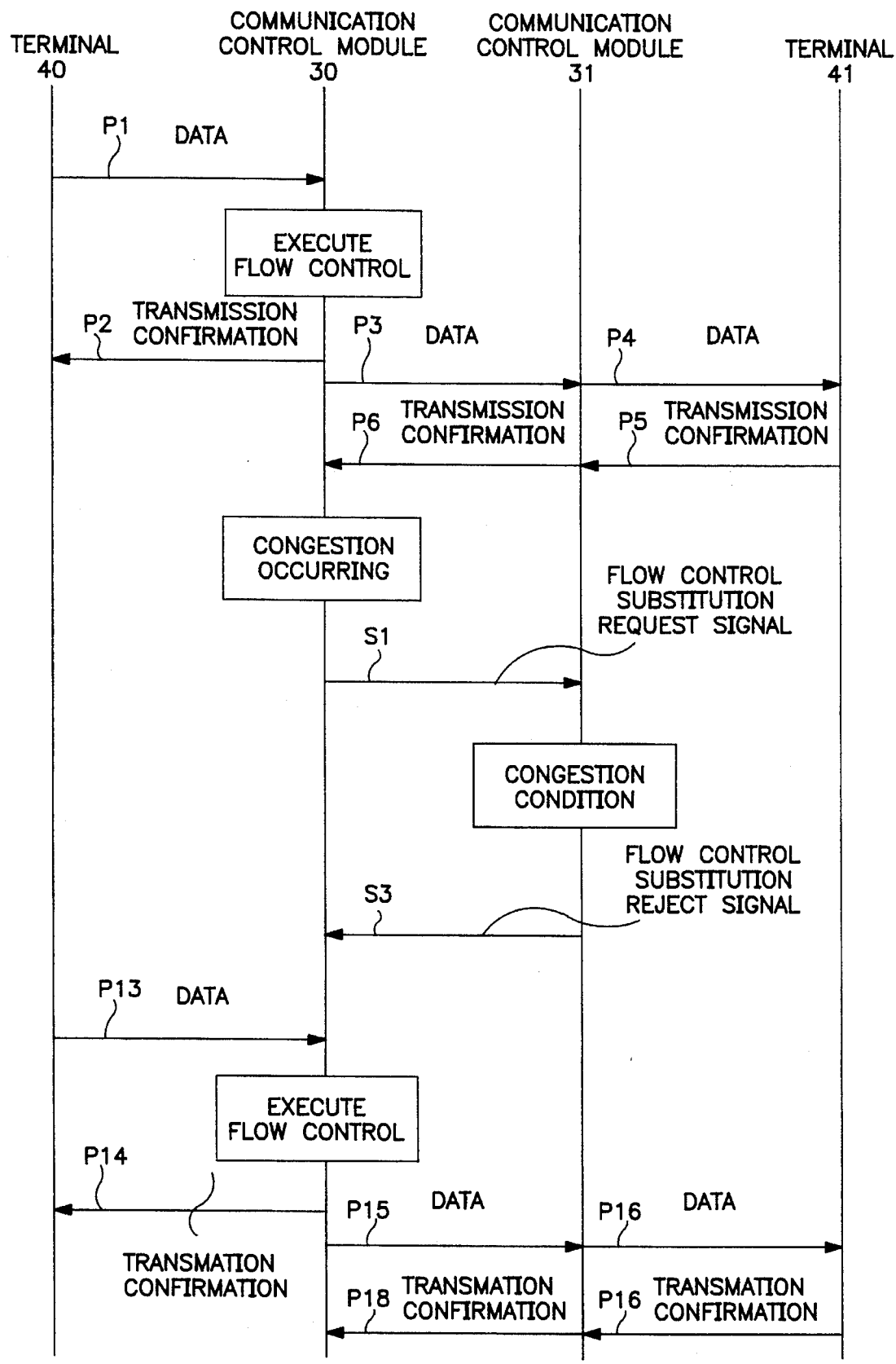
FIG. 3 is a sequence diagram showing data flow and signal flow when the substitution of the flow control execution is rejected by the other communication control module.

FIG. 2 is a sequence diagram showing data flow and signal flow when the change in flow control execution is accepted by the other communication control module, and FIG. 3 is a similar diagram when the changeover is rejected by the other communication control module due to congestion also existing at the other side.

First, the operation which the substitution of the flow control execution is in fact performed by the communication control module 31 in response to a request from the communication control module 30 will be described with reference to FIG. 2.

In the normal condition, the flow control is executed by the communication control module 30 which is specified at the time of establishing a logical channel for packet communications between terminals 40 and 41. A data packet P1 transmitted from terminal 40 is received by the communication control module 30, and the flow control execution unit 310 in the communication control module 30 executes the flow control, after which a transmission confirmation packet P2 indicating the next sequence number of a packet to be transmitted is sent back to the terminal 40 to allow transmission of the next data packet. Also, a data packet P3 is transmitted to the opposite communication control module 31 via the common bus 20.

The communication control module 31, upon receiving the data packet P3, transmits a dam packet P4 to the terminal 41 without executing any flow control, and the transmission confirmation packet P5 sent from the terminal 41 is passed along as transmission confirmation packet P6 by the communication control module 31 and is received by the flow control execution unit 310 in the communication control module 30. The above data flow occurs through the path f0 of FIG. 1.

As discussed above, the load on each communication control module is continuously monitored by its respective congestion detection unit, and when a congestion condition is detected by the congestion detection unit 330 at the communication control module 30 due to an excessive load, the flow control execution, control unit 320 is notified of this condition and acts to reduce the lead on its communication control module 30 by switching the flow control execution to the opposite communication control module 31.

In particular, the flow control execution control unit 320 requests substitution of the flow control by transmitting a flow control substitution request signal S1 to the flow control execution control unit 321 in the opposite communication control module 31 through the common bus 20. If the communication control module 31 is in a normal condition and available for additional processing, the communication control module 31 accepts the request for substitution of flow control by sending back a flow control substitution acceptance signal S2 to the flow control execution control unit 320 in the communication control module 30 through the common bus 20. Thereafter, the flow control is executed by the flow control execution unit 311 in the communication control module 31 by switching over the data communication path from the path f0 to the path f1, and the communication control module 30 becomes free of flow control execution.

Therefore, the next data packet P7 transmitted from the terminal. 40 is received by the communication control module 30, but it does not execute flow control and only passes along the data packet as a data packet P8 to the communication control module 31. The flow control is executed by the flow control execution unit 311 in the communication control module 31, and the transmission confirmation packet P9 indicating the next sequence number of a packet to be transmitted is sent back to the terminal 40 to allow the transmission of the next packet through the communication control module 30 which repeats and transmits the transmission confirmation packet as packet P10. The communication control module 31 transmits a data packet 11 to the terminal 41, and its transmission confirmation packet P12 from the terminal 41 is received by the flow control execution unit 311 in the communication control module 31. This data flow is transmitted through the path f1.

Now, the operation in which the communication control module 31 cannot accept the flow control substitution request from the communication control module 30 because of a congestion condition also occurring in the communication control module 31, will be described by referring to the sequence diagram in FIG. 3.

The operation sequence up to transmitting the flow control substitution request signal S1 is the same as shown in FIG. 2, i.e., the flow control is initially executed by the communication control module 30 which is specified when the logical channel is established, a data packet P1 is received by the communication control module 30 and a transmission confirmation packet P2 is sent back as a result of the flow control, and when a congestion condition is detected due to excessive lead, the flow control execution control unit 320 requests changeover of the flow control by transmitting a flow control substitution request signal S1 to the flow control execution control unit 321 in the opposite communication control module 31.

If the communication control module 31 is itself in a congestion condition and has insufficient capability for additional processing, the communication control module 31 rejects the substitution request by sending back a flow control substitution reject signal S3 to the flow control execution control unit 320 in the communication control module 30 through the common bus 20. Thereafter, the flow control substitution is not performed by the communication control module 31 but continues to be performed by the flow control execution unit 310 in the communication control module 30 through the data communications path f0.

Therefore, the next data packet P13 transmitted form the terminal 40 is received by the communication control module 30, and the flow control is executed by the flow control execution unit 310, and a transmission confirmation packet P14 is sent back to the terminal 40 indicating the next sequence number of a packet to be transmitted. A data packet P15 sent to the communication control module 31 which does not execute the flow control is passed along to the terminal 41 as a data packet 18. A transmission confirmation packet P 17 sent back from the terminal 41 is also repeated at the communication control module 31 and sent back to the flow control execution unit 310 in the communication control module 30.

As described above, the distributed type packet switching system and method of controlling flow control execution according to the present invention provide an effective usage of resources in the packet switching system by changing a communication control module to execute the flow control during a congestion condition, provided that the opposite communication control module is available for taking over the flow control execution.

Although the present invention has been fully described by way of preferred embodiments thereof with reference to the accompanying drawings, numerous changes and modifications will be apparent to those having skill in this field. Therefore, unless these changes and modifications otherwise depart from the scope of the present invention, they should be construed as included thereto.

I claim:

1. A distributed type packet switching system comprising a plurality of communication control modules, each communicating with at least one terminal for packet communications and controlling communication of packet information transferred between two of said terminals, and a common bus for connecting said plurality of communication control modules and providing communication paths for two of said communication control modules when communicating, said distributed type packet switching system further comprising:

flow control execution means in each of said two communication control modules for executing flow control of communication of packet information;

congestion detection means for detecting an overload condition in processing capability of one of said two communication control modules, and for outputting information of the detected overload condition; and control means for controlling execution of said flow control execution means by judging information output from said congestion detection means and information received from the other of said two communication control modules.

2. The distributed type packet switching system according to claim 1, wherein said control means comprising:

first signal transmit/receive means for sending a substitution request signal for said flow control to the other of said two communication control modules when said overload condition is indicated by said congestion detection means, and for receiving a response signal to said request signal from the other of said two communication control modules; and first switchover means for switching over said flow control execution means to stop its operation when substitution of said flow control is accepted by said other communication control module, said acceptance being indicated in said response signal.

3. The distributed type packet switching system according to claim 1, wherein said control means comprising:

second signal transmit/receive means for receiving a substitution request signal for said flow control in said other communication control module, for transferring a response signal of acceptance to said request signal when no information is being received from said congestion detection means, and for transferring a response signal of rejection to said request signal when said overload condition is being indicated by said congestion detection means; and second switchover means for switching over said flow control execution means to start its operation in said other communication control module when said response signal of acceptance to said request signal is transmitted.

4. A method of controlling flow control execution in a distributed type packet switching system including a plurality of communication control modules, each communicating with at least one terminal for packet communications and controlling communications of plackets transferred between two of said terminals, a common bus for connecting said plurality of communication control modules and providing communication paths for two of said communication control modules during communication therebetween, said method comprising the steps of:

executing flow control of communication of packet information;

detecting an overload condition in processing capability of one of said two communication control modules;

outputting information of said overload condition when detected;

transferring a request signal for substituting said flow control at the other of said two communication control modules when said overload condition is detected;

receiving a response signal to said request signal from said other communication control module; and controlling an execution operation of said flow control by judging said response signal from said other communication control module.

5. A method of controlling flow control execution in a distributed type packet switching system including a plurality of communication control modules, each communicating with at least one terminal for packet communications and controlling communications of packets transferred between two of said terminals, a common bus for connecting said plurality of communication control modules and providing communication paths for two of said communication control modules during communication therebetween, said method comprising the steps of:

detecting an overload condition in processing capability of one of said two communication control modules;

outputting information of said overload condition when detected;

receiving a request signal for substituting a flow control being executed in the other of said two communication control modules;

transferring a response signal of acceptance of substitution of said flow control to said request signal when said overload condition is not detected;

transferring a response signal of rejection of substitution of said flow control to said request signal when said overload condition is detected; and starting an execution of said flow control upon transferring said response signal of acceptance.

* * * * *